United States Patent [19]

Clark

[11] Patent Number: 5,197,311
[45] Date of Patent: Mar. 30, 1993

[54] FIFTH WHEEL JACK STAND LOCK

[75] Inventor: Burney E. Clark, La Pine, Oreg.

[73] Assignee: Norco Industries, Inc., Compton, Calif.

[21] Appl. No.: 840,156

[22] Filed: Feb. 24, 1992

[51] Int. Cl.$^5$ .................. B60R 25/02; F16B 41/00
[52] U.S. Cl. .................................. 70/232; 70/258; 248/352; 248/552; 280/507
[58] Field of Search ............... 70/232, 258; 248/352, 248/552; 280/504, 507

[56] References Cited

U.S. PATENT DOCUMENTS

| | | | |
|---|---|---|---|
| 2,641,124 | 6/1953 | Gallagher et al. | 70/232 |
| 2,656,706 | 10/1953 | Lucas et al. | 280/507 |
| 2,785,564 | 3/1957 | Rossi | 70/232 |
| 2,883,850 | 4/1959 | Falck | 70/232 X |
| 2,969,993 | 1/1961 | Jasper . | |
| 3,004,421 | 10/1961 | Bowler . | |
| 3,269,159 | 8/1966 | Young . | |
| 3,391,555 | 7/1968 | Mamo . | |
| 3,832,729 | 9/1974 | Gerlach | 70/232 |
| 3,982,413 | 9/1976 | Stone et al. | 70/229 |
| 4,003,228 | 1/1977 | Lievens et al. | 70/232 X |
| 4,141,233 | 2/1979 | Reyes | 70/232 |
| 4,285,221 | 8/1981 | Atchisson | 70/232 X |
| 4,596,371 | 6/1986 | Clark | 248/354.3 |
| 4,691,935 | 9/1987 | Brandt | 280/507 |
| 4,905,953 | 3/1990 | Wilson | 248/352 |
| 5,094,423 | 3/1992 | Almquist et al. | 248/352 X |

*Primary Examiner*—Lloyd A. Gall
*Attorney, Agent, or Firm*—Fulwider, Patton, Lee & Utecht

[57] ABSTRACT

A lockable stabilizing apparatus for connection to the king pin of a recreational vehicle and including a lockable collar device securable to such king pin. A pair of divergent legs project from such collar to engage the ground in spaced apart relationship to brace such king pin and, consequently, the frame of the recreational vehicle from rocking relative to the axis of the support wheels. The collar may incorporate a slotted arrangement for loose receipt of the legs of a shackle to provide for wobble of the collar relative to the king pin.

8 Claims, 1 Drawing Sheet

FIFTH WHEEL JACK STAND LOCK

BACKGROUND OF THE INVENTION

1. Field of the Invention

The invention relates to a support for stabilizing the frame of a recreational vehicle and includes a locking arrangement for preventing access to the king pin of such vehicle.

2. Description of the Prior

With the present day popularity of recreational vehicles of the type which incorporate a king pin for attachment to a towing vehicle, the use of such recreational vehicle and towing vehicle has been expanded. Often times such towing vehicles are, upon arrival at a vacationer's destination, detached from the towed vehicle and utilized for transportation on side trips. When the tourist is then absent from presence in or about such recreational vehicle, the vehicle itself presents an enormous temptation for unauthorized persons to take possession thereof and remove it to a remote site where the vehicle itself may be broken into for removal of valuable contents or the vehicle itself sold as a used vehicle. It is the ready access to the king pin of such towable recreational vehicles that enhances the temptation to hook onto such unattended vehicle with a towing vehicle to remove it from its unattended site.

Another problem presents itself when occupants move about the interior of the vehicle when detached. Typically, the forward end of the towed vehicle is supported by extended telescopical leveling posts or other supports located at the corners and which must be carefully adjusted for leveling the vehicle for the comfort of the occupants to thus provide support against shifting of the enclosure relative to the supporting rear axle upon movement of the occupant from side to side within the interior thereby resulting in different weight and balance on the suspension springs. The incorporation of such leveling support legs within the body of the towed vehicle is an expensive proposition and, by itself, fails to prevent any significant obstacle to the unauthorized taking of such an unattended vehicle when detached from the towing vehicle. Consequently, there exists a need for a support apparatus which may be temporarily attached to the fifth wheel of the recreational vehicle for support of the front extremity of such vehicle in a manner which will present resistance to tilting of the vehicle on its suspension springs and which will also restrict access to such fifth wheel by unauthorized persons who do not have a key or other combination to release of the support apparatus.

Recognition of the security problems attendant unattended towable vehicles has led to the proposals of numerous different styles of locking collars attachable to the detached king pin of such vehicle. Examples of such prior locking collars are disclosed in the following U.S. Pat. Nos. 2,656,706; 2,785,564; 3,004,421; 3,269,159; 3,832,872; 3,982,413; 4,141,233; and 4,691,935. It is a general characteristic of prior art locking collars that they typically form a close fit with the fifth wheel, thus securing such collars against any significant movement relative to such fifth wheels. This characteristic, while in many instances adequately restricting unauthorized access to such fifth wheels, constitutes a restriction on the utility of such locking collars as an attachment mechanism for a strut support which might act to support the front extremity of the vehicle and afford resistance to rocking of the vehicle on its suspension springs.

Efforts to provide a satisfactory and stabilizing device has led to the proposal of a pair of extendable, divergent, strutlike legs connected at their top ends by means of a collar to the fifth wheel of a recreational vehicle and constrained on their bottom extremities by a chain. A device of this type is shown in U.S. Pat. No. 4,596,371 to Clark and assigned to the assignee of the rights in this application. Such a stabilizing device, while satisfactory for its intended purpose, suffers the shortcoming that it makes no provision for locking of the collar to the fifth wheel to thereby restrict access by unauthorized persons.

SUMMARY OF THE INVENTION

A collar device embracing the peripheral groove of a recreational vehicle king pin and a pair of support legs diverging outwardly therefrom to foot elements to thereby support the king pin and vehicle against rocking relative thereto. A security device is carried from the collar and engageable with the king pin groove to retain the collar against removal by unauthorized individuals. In one embodiment, the connection between the retainer and collar provides for shifting or wobble of the collar relative to the king pin to allow for adjustment of the angle at which the legs extend.

Other objects and features of the invention will become apparent from consideration of the following description taken in conjunction with the accompany drawing.

DESCRIPTION OF THE PREFERRED EMBODIMENT

Figure 2:
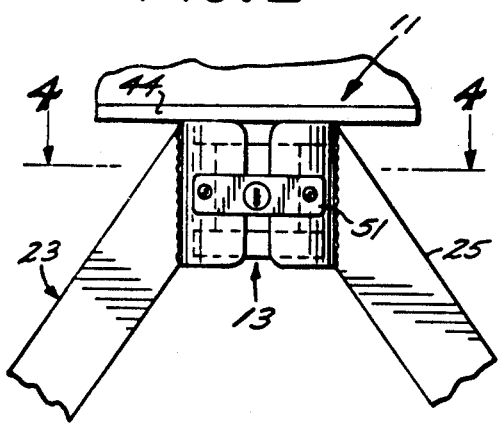
FIG. 2 a partial front broken elevational view similar to FIG. 1 but in enlarged scale.
Figure 3:
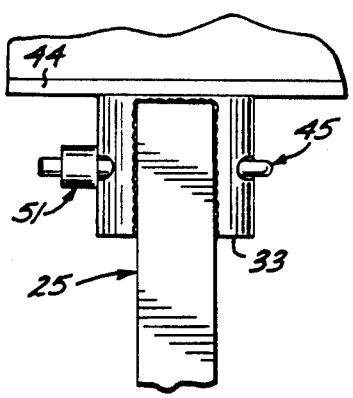
FIG. 3 is a right hand side view of the apparatus shown in FIG. 2.
Figure 4:
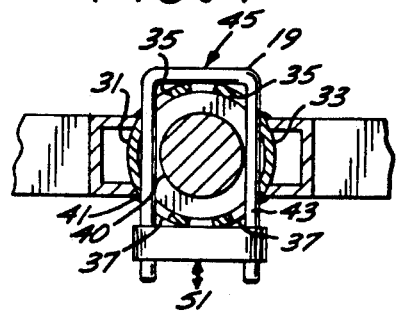
FIG. 4 is a horizontal sectional view taken along the line 4—4 of FIG. 2.

Referring to FIGS. 2 and 4, the stabilizing apparatus of the present invention includes, generally, a locking collar 11 for securement to the fifth wheel 13 of a recreational trailer 15. The collar 11 is locked in position by means of a locking device, generally designated 19, which includes a key actuated lock cylinder 21. Diverging outwardly from the opposite sides of the collar 11 are respective support legs 23 and 25 which support the recreational vehicle against rocking relative to the axle supported by its wheels 29.

The recreational vehicle 15 is a conventional trailer type vehicle which incorporates a closure 30 including a support floor 32 and forwardly projecting overhang 34 underneath which is mounted the fifth wheel 13. The fifth wheel 13 is carried from a mounting plate 44 and is of generally spool shaped construction having upper and lower flanges 36 and 38 separated by a reduced in diameter vertical shaft 40 which defines a peripheral groove 42.

The collar device 11 is constructed of a pair of semi-cylindrical half collars 31 and 33 (FIG. 4), each of which incorporate pairs of aligned, circumferentially outwardly and downwardly extending oversized slots 35 and 37 for receipt of the opposite legs 41 and 43 of a U-shaped locking clevis, generally designated 45. Thus, as one side of the collar or the other is raised by one or the other of the legs 23 or 25 wobble movement thereof relative to fifth wheel 13 is allowed to provide for cocking of such collar to maintain a relatively uniform lifting weight on such wheel without binding of the retainer 45.

This wobble movement may be provided by any one of a number of different arrangements, such as limited relative play between the opposed legs 41 and 43 of the clevis 45 and the straddled shank 40.

The lock device further includes a yoke 51 formed with spaced apart bores for receiving the free extremities of the exposed legs 41 and 43 and includes the central lock cylinder 21 which is formed with a key way for receipt of a key and is operative to lock such yoke in locked position on the legs 41 and 43.

The legs 23 and 25 are of a square hollow tubular construction and are welded on their top ends to the opposite sides of the respective collar halves 31 and 33 and diverge generally downwardly and outwardly therefrom. The legs 23 and 25 include hollow open ended stub legs 57 and 58 into which the upper extremity of telescopical extensions 59 and 60 are received.

A plunger adjustment lock, generally designated 61, is mounted in the stub leg 57 and includes a plunger 63 projecting through a bore in the wall thereof to engage a selected spaced apart bores in the wall of the extension leg 59 for adjusting the relative vertical extension thereof.

A ratchet jack, generally designated 64 is mounted on the stub leg 58 for selectively extending the exterior leg 60 to elevate that side of the trailer.

Figure 1:
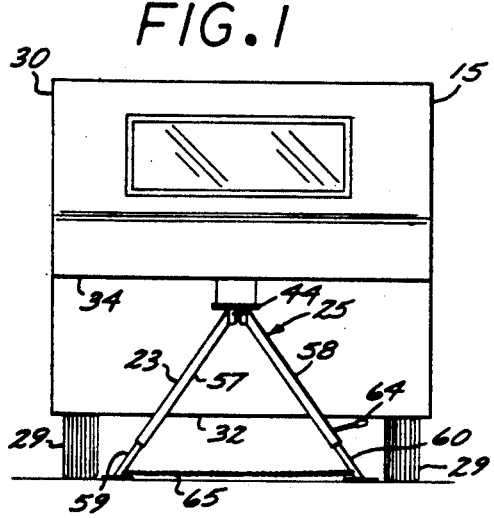
FIG. 1 is a front elevational view of a total recreational vehicle to which having a stabilizing apparatus of the present invention secured to the fifth wheel thereof.

Referring to FIG. 1, connected between the lower extremities of such legs 23 and 25 is a restraining chain 65 which limits the divergence of such legs.

In operation, the stabilizing apparatus of the present invention is stored in the luggage compartment of the trailer 15 or in the towing vehicle. When the destination for parking of the trailer is reached, the king pin 13 may be released for disengagement. As the king pin 13 clears the fifth wheel, the collar 11 may be secured in position by engaging the collar halves 31 and 33 on opposite sides of such king pin and inserting the legs 41 and 43 of the shackle 45 through the respective slots 35 and 37 to extend the free extremities thereof for engagement by the yoke 51. The yoke 51 may then be locked in position securing the top of the stabilizing apparatus in place on the king pin.

Figure 5:
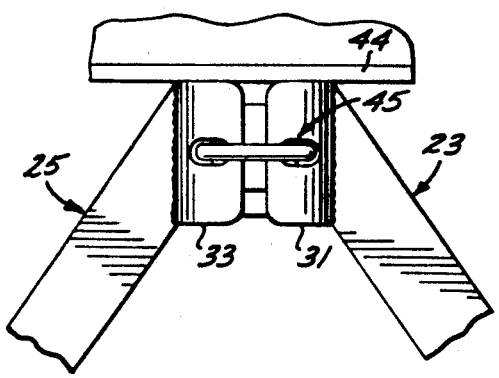
FIG. 5 is a back view of the stabilizing apparatus shown in FIG. 2.
Figure 6:
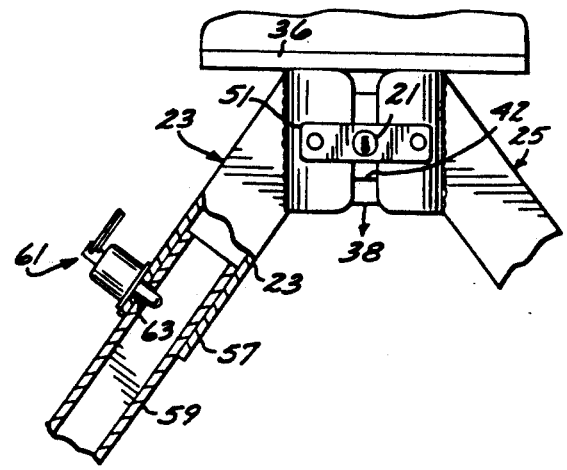
FIG. 6 is a front view similar to FIG. 2 but partially in section.

The support legs 23 and 25 are positioned in their divergent orientations like that shown in FIG. 1 and adjusted to the desired length to accommodate any incline to thus establish ground contact. The foot ends will be constrained by the chain 65 which may be adjusted in length to hold against spreading. The ratchet jack 64 jacked up to lift the collar 11 and drive the top ends of the half collars 31 and 33 up against the underside of the mounting plate 44 to lift the trailer. Due to the constraint of the chain 65, the support legs will be driven together at their top ends to press the half collars 31 and 33 securely against the opposite sides of the king pin. It is of significance that any resultant reorientation of the half collars 31 and 33, will be accommodated by the play provided for in the loose fit of the clevis leg 43 in the oversized slot 35 (FIGS. 4 and 5). For instance, as the ratchet 64 extends the leg 25 it will cooperate to press against the side of the king pin 13 to resist rocking of the trailer. The slots 35 and 37 will accommodate rocking of the half collar 33 and counterbalancing collar 33 relative to the king pin thus allowing the top end thereof to maintain lifting contact on the plate 44 without binding against the shackle legs 41 and 43 to thereby prevent applying undue loads to the lock yoke 51.

Once the weight is taken off the fifth wheel of the towing vehicle, it may be moved away from the parked area to leave the front end of the trailer supported on the legs 23 and 25. The trailer 15, even though left unattended, will be secure against removal by unauthorized persons attempting to hook a towing vehicle thereto. Locking of the collar in position restricts access to such king pin. However, when the owner returns and eventually elects to move the trailer, ready access can be had to the king pin by merely unlocking the lock cylinder and removing the shackle 45 and, consequently, the stabilizing device.

From the foregoing it will be appreciated that the stabilizing device of the present invention provides an economical and convenient means for stabilizing the recreational vehicle and for restricting access thereto by a towing vehicle operated by an unauthorized individual.

Various modifications and changes may be made with regard to the foregoing detailed description without departing from the spirit of the invention.

What is claimed is:

1. Stabilizing apparatus for engagement with a king pin of a towable recreational vehicle and of the type formed with a peripheral groove defining a central shaft and comprising:
    a collar device for engaging said king pin;
    a shackle device carried from said collar device and engageable in the opposite sides of said groove;
    wobble means interposed between said shackle device and said collar device to provide for relative movement between said collar device and said king pin; and
    support legs attached at their respective upper ends to the opposite sides of said collar device and diverging downwardly to engage their bottom ends with the underlying ground surface whereby said collar device may be engaged with said king pin to be held captive thereto by receipt of said shackle device in said groove to cause said legs to diverge downwardly to engage the bottom ends thereof with the ground and said wobble means will provide for wobble of said collar device relative to said king pin to thereby accommodate support of said legs on uneven underlying ground surface.

2. Stabilizing apparatus according to claim 1 wherein; said collar device includes opposed collar halves, each half being formed with slots aligned with the diametrically opposite sides of said groove to thus provide pairs of slots in said opposed collar halves.

3. Stabilizing apparatus according to claim 1 wherein: said collar device includes half collars disposed on the opposite sides of said king pin and formed with aligned pairs of slots; and said shackle device includes a pair of retaining legs, each said retainer leg being received through a pair of said slots and arranged to straddle said shaft.

4. Stabilizing apparatus according to claim 1 wherein:
said collar device includes half collars engaged against the opposite sides of said king pin, at least one pair of aligned slots, one formed in each said half collar; and
said shackle device includes at least one leg received in said pair of slots and received in one side of said groove to retain said collar device on said king pin.

5. A locking stabilizing apparatus for connection to a king pin of a recreational vehicle of the type formed with a peripheral groove defining a shaft having a predetermined diameter, said apparatus comprising:
a split collar device including a pair of semi-cylindrical collars configured to embrace the opposite sides of said king pin;
a pair of divergent support legs connected on their upper ends to said respective collars for bracing said respective collars against the opposite sides of said king pin and extendable to engage their respective bottom ends with the ground to brace such vehicle against rocking relative to a horizontal plane, said collars being formed with respective pairs of aligned slots spaced laterally apart a distance corresponding, when said collars are embracing the opposite sides of said king pin, to said predetermined diameter;
a U-shaped locking shackle configured with legs spaced laterally apart a distance greater than said predetermined diameter for extension through the respective pairs of said aligned slots; and
a security locking device engageable with said shackle to lock it in position relative to said collar device whereby said recreational vehicle may be parked, said support legs moved into position embracing the opposite sides of said king pin and said shackle legs inserted in said respective pairs of slots to be disposed in locking relation in said groove and said locking device locked to secure said apparatus to said king pin to prevent access thereto by unauthorized individuals.

6. Stabilizing apparatus according to claim 5 wherein:
said shackle is formed on its closed end with a lateral span for abutting one side of said collar device and said legs are of sufficient length to, when said span is in contact with said one side, project from the side of said collar device opposite said one side and said locking device is in the form of a yoke formed with bores for receipt of said legs.

7. Stabilizing apparatus according to claim 5 wherein:
said slots are elongated in the circumferential direction to allow for circumferential movement of said collar device relative to said shackle to thereby allow for wobble of said collar device relative to said king pin.

8. Stabilizing apparatus according to claim 5 that includes:
means providing for relative movement of said collar device relative to said shackle to provide for wobble of said collar device relative to said king pin.

* * * * *